United States Patent [19]

Takamiya et al.

[11] Patent Number: 4,484,756
[45] Date of Patent: Nov. 27, 1984

[54] BLANK TUBE AND MAIN FRAME FOR TWO-WHEELED VEHICLE

[75] Inventors: Kikuzo Takamiya, Kitamoto; Hiroshi Todoroki; Shuichi Taniguchi, both of Ageo, all of Japan

[73] Assignee: Bridgestone Cycle Co., Ltd., Tokyo, Japan

[21] Appl. No.: 438,494

[22] Filed: Nov. 2, 1982

[30] Foreign Application Priority Data

| Nov. 4, 1981 | [JP] | Japan | 56-176674 |
| Nov. 4, 1981 | [JP] | Japan | 56-176676 |
| Nov. 6, 1981 | [JP] | Japan | 56-177037 |
| Jun. 24, 1982 | [JP] | Japan | 57-93679[U] |
| Jun. 24, 1982 | [JP] | Japan | 57-93680[U] |

[51] Int. Cl.³ .............................................. B62K 3/02
[52] U.S. Cl. .............................. 280/281 R; 29/421 R
[58] Field of Search .................... 280/281 R; 301/124; 29/421 R

[56] References Cited

U.S. PATENT DOCUMENTS 556,805  3/1896  Carlson ............................... 280/279
2,133,091 10/1938  Gettig ............................... 301/124 R

FOREIGN PATENT DOCUMENTS 7783 of 1896  United Kingdom ............ 280/281 R

OTHER PUBLICATIONS

Bicycling, "The Workshop", pp. 102–108, Jul. 1982.

Primary Examiner—Joseph F. Peters, Jr.
Assistant Examiner—Donn McGiehan
Attorney, Agent, or Firm—Parkhurst & Oliff

[57] ABSTRACT

A blank tube constituting a main frame for a two-wheeled vehicle, comprises a main tubular portion having thicker walls in the proximity of its ends subjected to the largest forces and tubular expanded portions extending from the ends of the tube for receiving a head tube and a seat tube without using separate parts such as lugs. The blank tube further comprises a gradually enlarged diameter portion adjacent to the tubular expanded portions to more improve the strength of the tube.

The thicker walls, tubular expanded portions and gradually enlarged diameter portion are formed simultaneously in dies by bulging. Moreover, the dies are formed with recesses, so that the blank tube is formed with protrusions. The protrusions are formed with apertures for passing brake wires or electric wires through the tube. The main tubular portion of the blank tube is formed in a particular cross-section effectively increasing its strength by pressing by means of the dies including corresponding sectional cavities.

12 Claims, 32 Drawing Figures

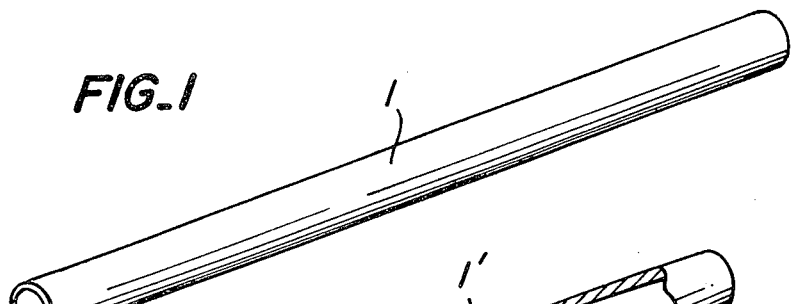
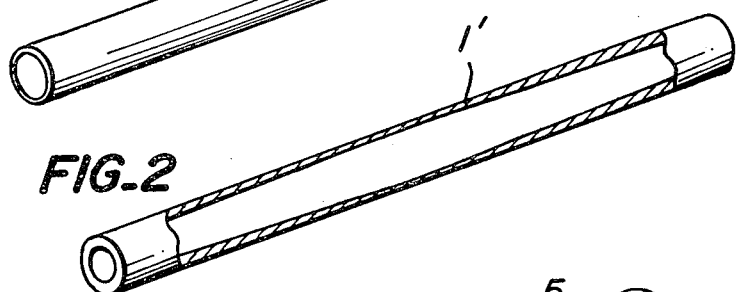
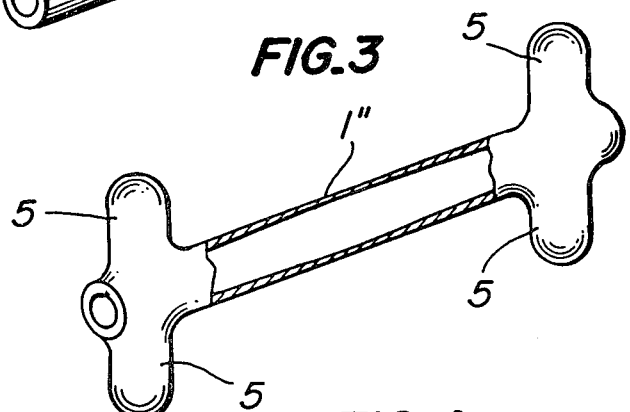
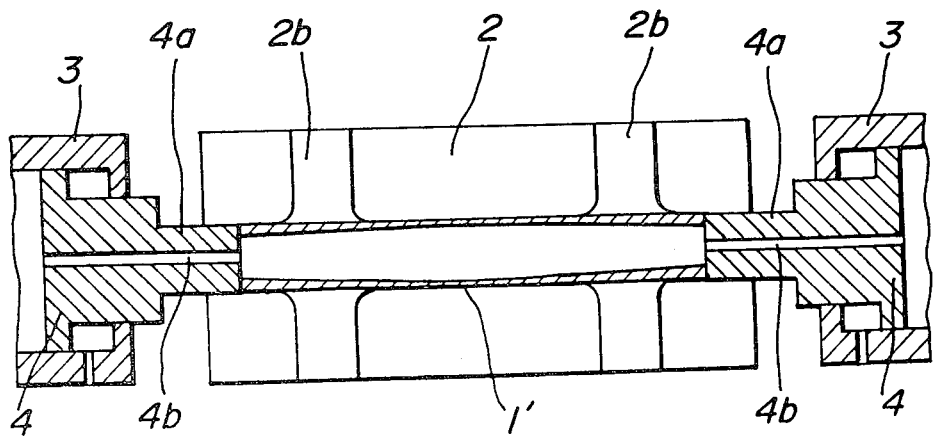

FIG_21
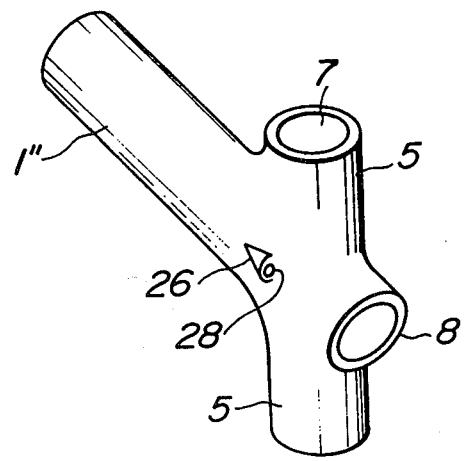
FIG_22
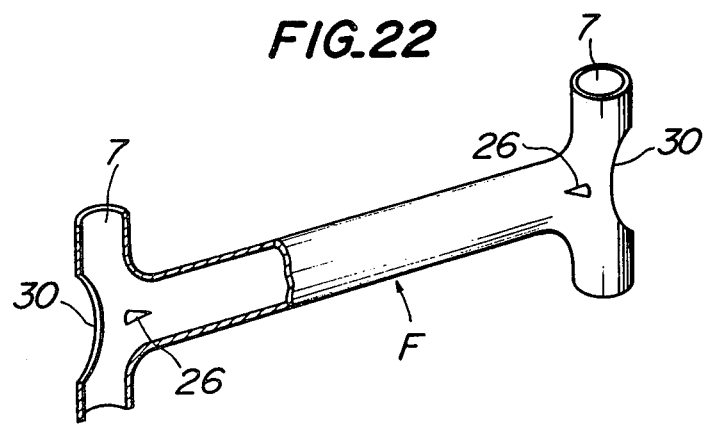

FIG_23
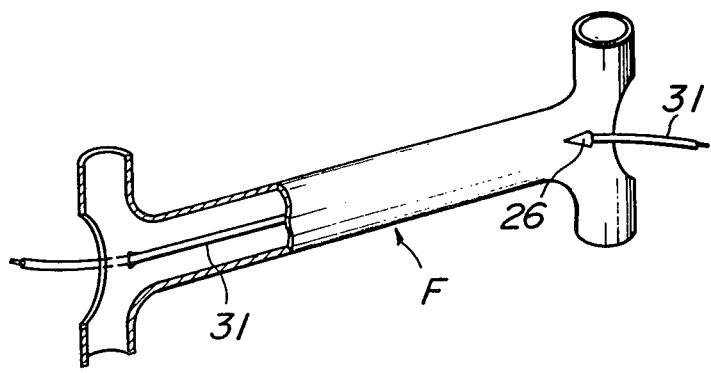
FIG_24
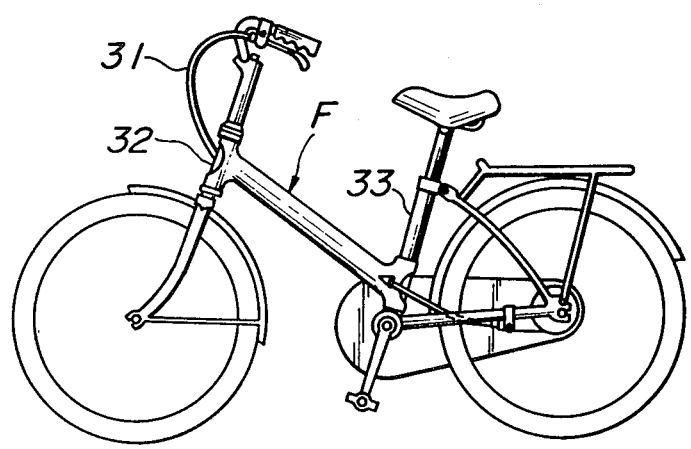

BLANK TUBE AND MAIN FRAME FOR TWO-WHEELED VEHICLE

BACKGROUND OF THE INVENTION

1. Field of the Invention

This invention relates to a blank tube for constituting a main frame of a two-wheeled vehicle such as a bicycle, motorcycle or the like and more particularly to a main frame for a two-wheeled vehicle.

2. Description of the Prior Art

With a hitherto used main tube forming a main frame for a two-wheeled vehicle such as a bicycle, the main tube has been formed as a member separate from a head tube and a seat tube. In order to join respective tube members consisting the main frame, respective ends of the tube members have been inserted into and welded to separate lugs arranged between the tube members or lugs have been cast the ends of the tube members to form a unitary main frame.

The joints of a tube member at its ends are in general subjected to the maximum stresses in the member. Accordingly, if the welding is incomplete resulting, for example, from unskillful welding operation, extreme irregularity in strength at the weld will cause stress concentration. Moreover, the tube members are heated at the joints by welding or casting, so that the quality of the material of the tube members changes by thermal attack to lower its strength. Furthermore, such a joining operation is so complicated that its production efficiency is low.

In order to pass brake cables or electric lead wires in the main tube, the front and rear ends of the main tube are formed with hemiconical protrusions welded thereto and then formed at the protrusions with through-apertures obliquely passing through the main tube.

However, such a method requires many members for the operation and is poor in production efficiency because of its complicated working and assembling operation. Moreover, the heating in welding is apt to cause local weakness in the tube.

A main tube having a circular cross-section is often anxious for its strength because of a great force acting on the main tube in its axial direction. Accordingly, a blank tube having sufficient strength without increasing its weight has been expected.

SUMMARY OF THE INVENTION

It is an object of the invention to provide a blank tube and a main frame for a two-wheeled vehicle, which blank tube is formed integrally with joints for a head tube and a seat tube without requiringb lugs and has thicker walls at its ends subjected to larger stresses to increase its strength and effectively distributed thickness of walls at required portions to provide a light frame for the vehicle and to improve its production efficiency.

It is a more specific object of the invention to provide a blank tube and a main frame for a two-wheeled vehicle, which increases its strength by providing with its main tubular portion with an enlarged diameter portion.

It is a principal object of the invention to provide a blank tube and a main frame for a two-wheeled vehicle, which is formed with apertures for passing brake wires or electric wires through the tube, such a formation of the apertures is effected simultaneously with the forming the entire blank tube by bulging, thereby reducing the number of parts, simplifying the working and assembling to improve the production efficiency and providing main frames for two-wheeled vehicle superior in strength.

It is a further object of the invention to provide a blank tube and a frame for a two-wheeled vehicle, whose cross-section is particular shape such as elliptical to remove superfluous wall thickness for its strength and to facilitate the production of the tube and frame.

The invention will be more fully understood by referring to the following detailed specification and claims taken in connection with the appended drawings.

BRIEF DESCRIPTION OF THE DRAWINGS

FIG. 1 is a perspective view of a tube prior to working it;

FIG. 2 is a perspective view of a tube, partially broken away, gradually thicker in the proximity of ends having no expanded portions;

FIG. 3 is a perspective view of a blank tube according to the invention;

FIG. 4 is a sectional view of an apparatus for forming the blank tube according to the invention;

FIG. 6b is a sectional view of the blank tube shown in FIG. 6a;

FIG. 9b is a sectional view of the blank tube shown in FIG. 9a;

FIG. 17a is a sectional view of the die taken along the line A—A in FIG. 17a;

FIG. 21 is a perspective view of one end of the blank tube shown in FIG. 20 whose hemiconical protrusion is formed with an aperture;

FIG. 22 is a perspective view, partially removed, of the blank tube shown in FIG. 21, whose compressed ends are cut off;

FIG. 23 is a perspective view, partially removed, of the blank tube shown in FIG. 22 including a brake wire passing through the apertures of the hemiconical protrusions;

FIG. 24 illustrates an entire bicycle using a main frame according to the invention;

DETAILED DESCRIPTION OF THE PREFERRED EMBODIMENT

FIG. 1 illustrates a conventional blank tube for manufacturing a blank tube for a two-wheeled vehicle according to the invention, which has a substantially uniform wall thickness and a length longer than that of a completed tube.

In order to manufacture the blank tube according to the invention, the following method of forming frame tubes for a two-wheeled vehicle is carried out. This method includes steps of arranging a blank tube as shown in FIG. 1 in a straight cavity of a pair of separable dies having expanding cavities located on both sides of the straight cavity, embracing the blank tube by stepped portions of two base cores adapted to be inserted into the straight cavity and further stepped portions of two punching shafts, and pressing the blank tube by means of the punching shafts and simultaneously forcing a hydraulic liquid into an inside of the blank tube to expand it into the expanding cavities.

Figure 5:
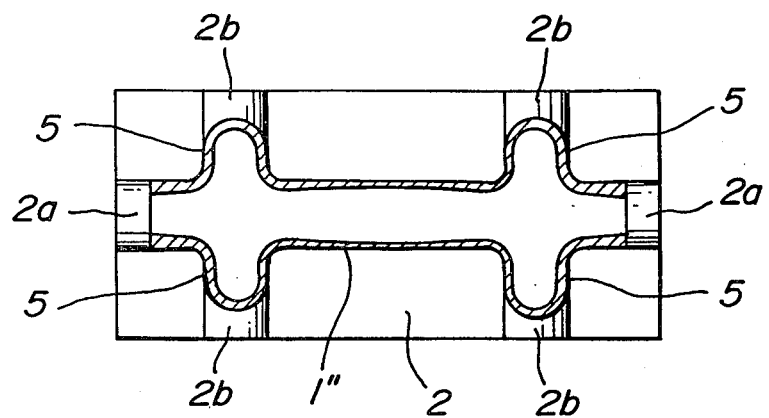
FIG. 5 is a sectional view of a blank tube subjected to the bulging action in separable dies.

FIGS. 4 and 5 illustrate such separable dies 2 including a straight cavity 2a and expanding cavities 2b. Each of hydraulic cylinder 3 includes a piston 4 having a punching shaft 4a integral therewith and formed with a through-hole 4b passing through the piston 4.

Figure 6A:
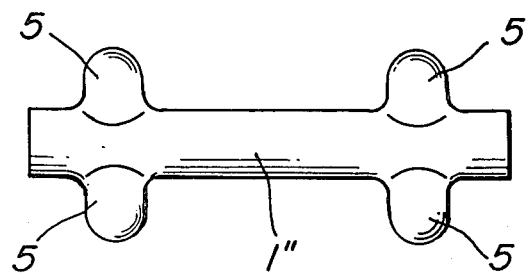
FIG. 6a is a schematic view of a blank tube according to the invention.
Figure 6B:
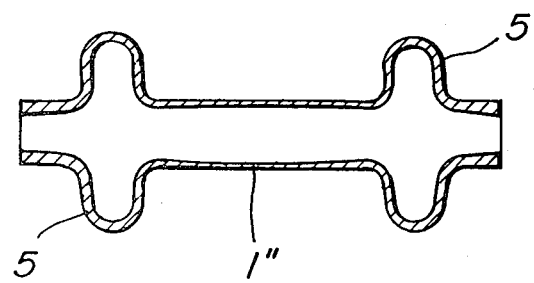

According to the invention, the tube 1 as a blank material is inserted into the straight cavity 2a in the separable dies 2. Then compressive force is applied to the tube 1 in its axial direction by the punching shafts 4a, while a high hydraulic pressure is applied through the through-holes 4b to the interior of the tube, so that the tube 1' gradually smoothly increases its wall thickness as it is nearer to its ends, which will be subjected to higher stresses when it is incorporated in a bicycle, as shown in FIGS. 2 and 4 and extends its tubular expanded portions 5 in upper and lower directions at the ends of the tube 1' as shown in FIGS. 3 and 5 to form a blank tube 1" for a frame of a two-wheeled vehicle. FIG. 6a is an outside view of the blank tube 1" whose section is shown in FIG. 6b.

Figure 7:
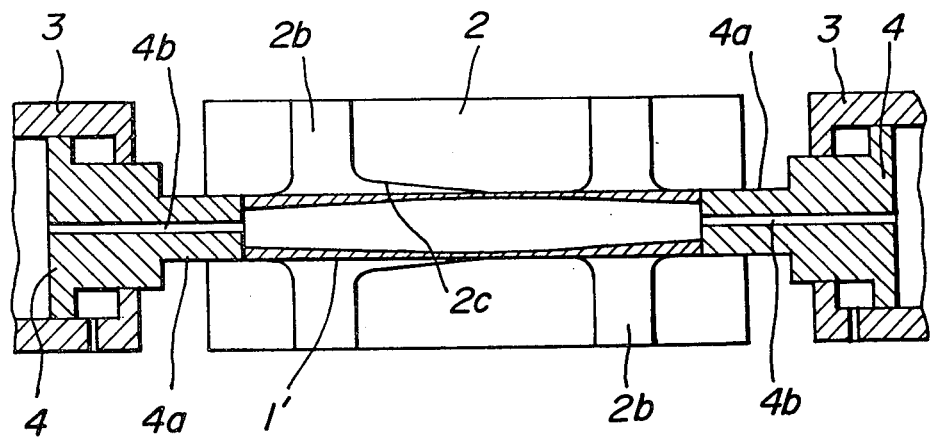
FIG. 7 is a sectional view of an apparatus for forming the blank tube of another embodiment of the invention.
Figure 8:
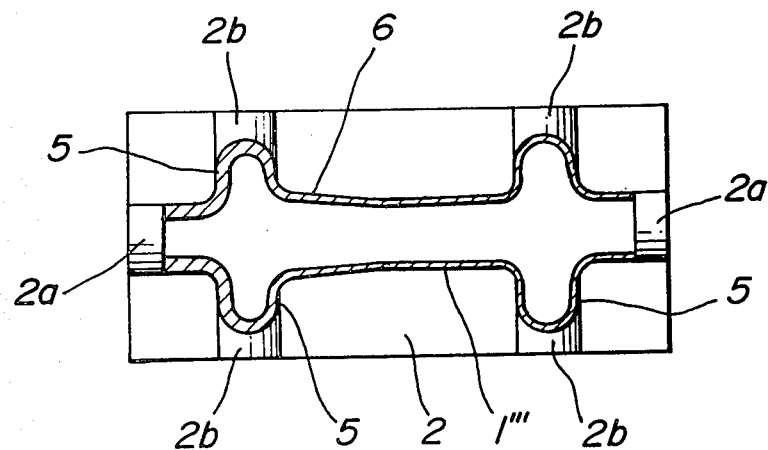
FIG. 8 is a sectional view of the blank tube formed in separable dies shown in FIG. 7.
Figure 9A:
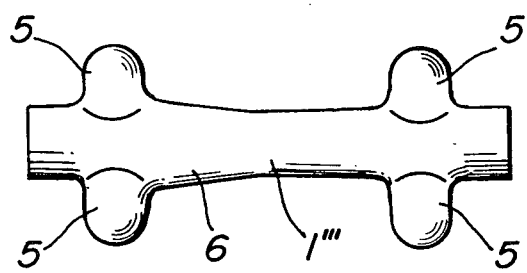
FIG. 9a is a schematic view of the blank tube shown in FIG. 8.
Figure 9B:
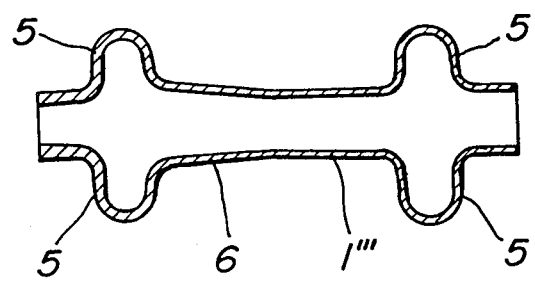
Figure 10:
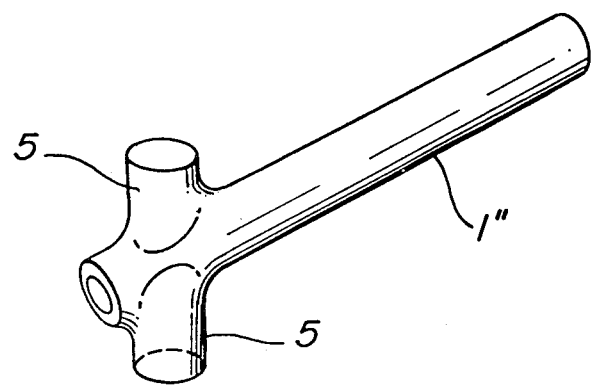
FIG. 10 is a perspective view of a blank tube having expanded portions only at one end according to the invention.

FIGS. 7 and 8 illustrate another embodiment of the invention, wherein the same reference numerals used in FIGS. 4 and 5 have been utilized to identify like parts. In this embodiment, dies 2 have a straight cavity 2a including a gradually enlarged diameter cavity portion 2c adjacent to expanding cavities 2b. With this arrangement, a tube 1 is inserted into the dies 2 and treated in the same manner as in the above embodiment to form a blank tube 1''' for a two-wheeled vehicle frame, which includes a gradually enlarged diameter portion 6 adjacent to tubular expanded portions 5 as shown in FIGS. 8 and 9. FIG. 9a is an outside view of the blank tube 1''' whose sectional view is FIG. 9b. FIG. 10 is a perspective view of a blank tube 1" having tubular expanded portions 5 only at its one end for a further embodiment, but does not have the gradually enlarged diameter portion 6.

Figure 11:
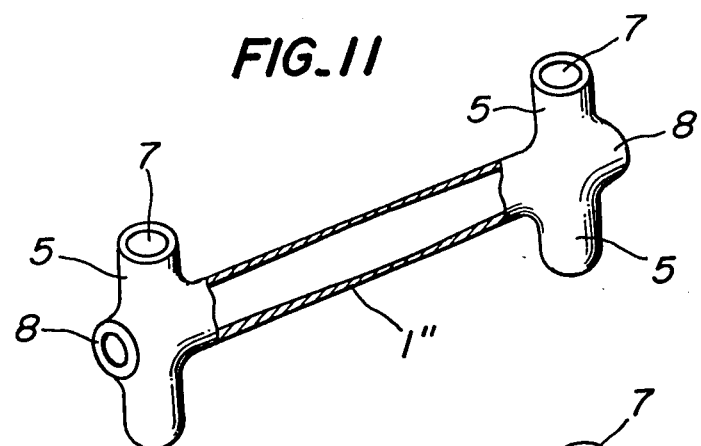
FIG. 11 is a perspective view of a blank tube according to the invention whose distal ends of expanded portions are cut off to form through-holes.
Figure 12:
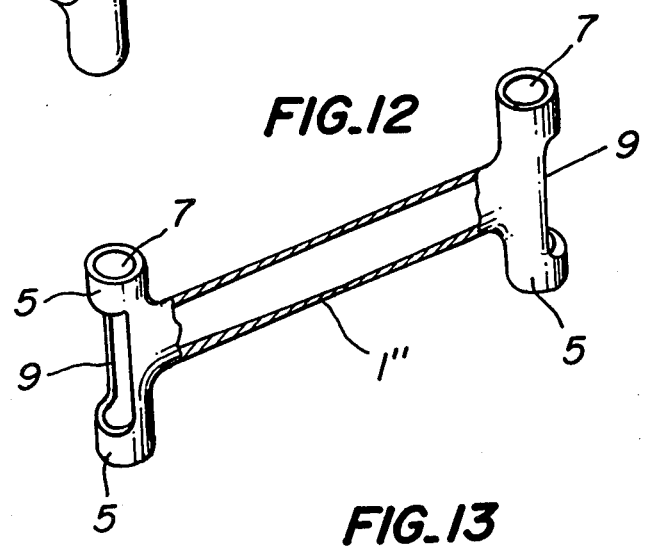
FIG. 12 is a perspective view of the blank tube shown in FIG. 11 whose compressed ends are cut off.
Figure 13:
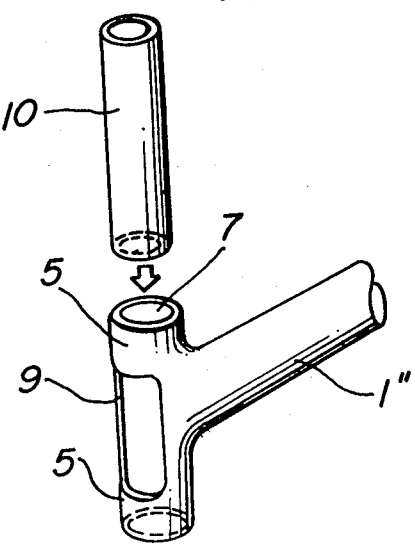
FIG. 13 is a perspective view of a blank tube according to the invention, into a through-hole of which a head tube is being inserted.
Figure 14:
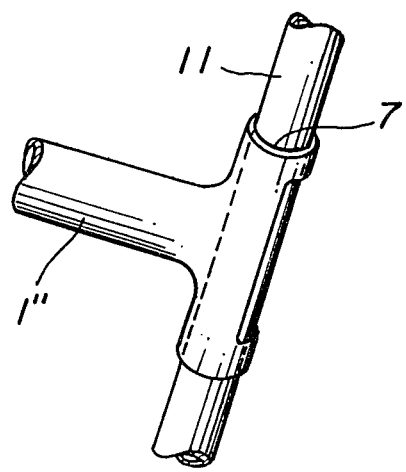
FIG. 14 is a perspective view of the other end of the blank tube shown in FIG. 13 receiving a seat tube passing through the through-hole of the end.

Distal ends of the tubular expanded portions 5 of the blank tube 1" formed according to the first embodiment of the invention are cut off to obtain through-holes 7 as shown in FIG. 11. If required, both the compressed ends 8 of the blank tube 1" are cut off by punching or cutting to form openings 9 as shown in FIG. 12. A head tube 10 is then inserted into and fixed to one of the through-holes 7, for example, as shown in FIG. 13, while a seat tube 11 is inserted into and fixed to the other through-hole 7 as shown in FIG. 14.

Figure 15:
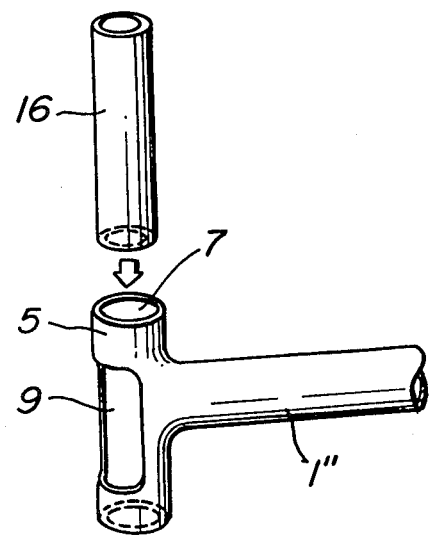
FIG. 15 is a perspective view of one end of a blank tube according to the invention, into a through-hole of which an inner tube is being inserted.
Figure 16:
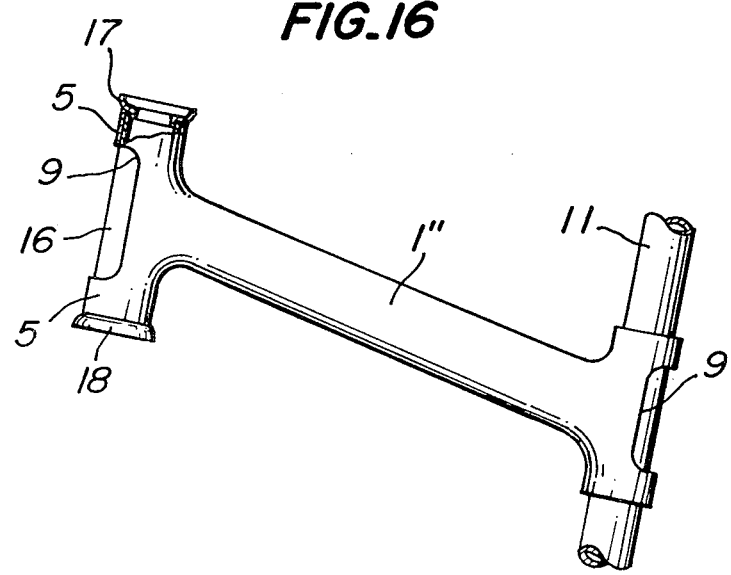
FIG. 16 is a perspective view of a main frame, partially removed, according to the invention.
Figure 17A:
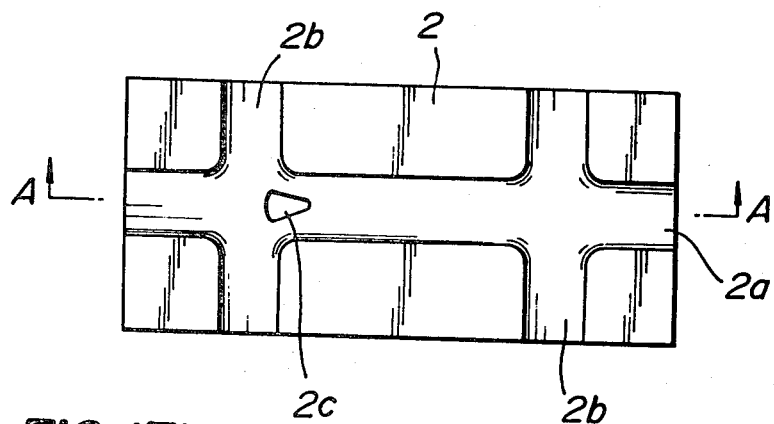
Figure 17B:
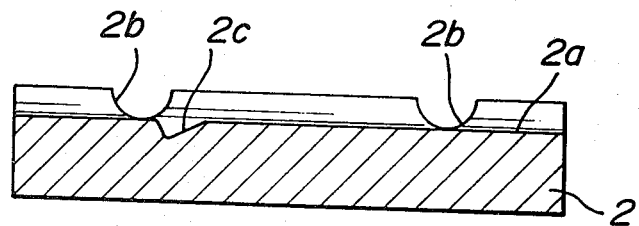
FIG. 17b is a plan view of a separable die having a recess for forming a blank tube according to the invention.

In a further embodiment of the invention, an inner tube 16 is press fitted in a through-hole 7 of a blank tube 4" as shown in FIG. 15, and a top bearing cup 17 and a bottom bearing cup 18 are press fitted in an upper and a lower end of the inner tube 16 to form a top and a bottom bearing support as shown in FIG. 16. At the same time, a seat tube 11 is inserted and fixed to the other through-hole 7.

According to a preferred embodiment of the invention, separable dies 2 are formed in straight cavities 2a with hemiconical recesses 2c at desired positions, respectively. Using such dies, a blank tube 1 is inserted in the straight cavity 2a and then subjected to compressive force in its axial direction by the punching shafts 4a, while a high hydraulic pressure is applied to the inside of the tube as shown in FIG. 4, so that the tube 1' gradually smoothly increases its wall thickness as it is nearer to its ends and extends its tubular expanded portions 5 in upper and lower directions at the ends of the tube 1" as viewed in FIG. 18, as mentioned with reference to FIGS. 3–9.

Figure 18:
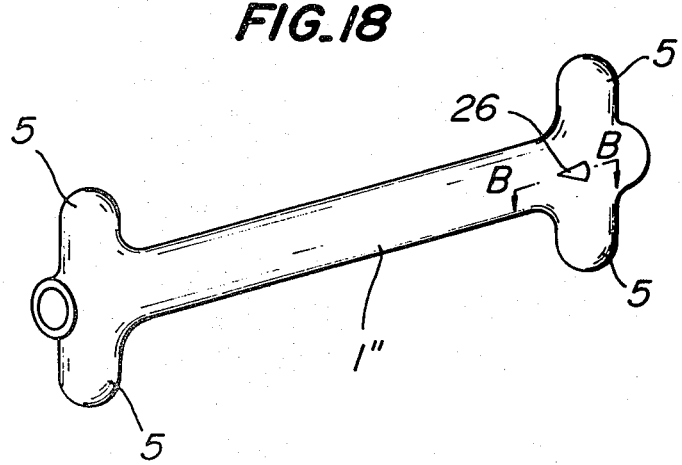
FIG. 18 is a perspective view of a blank tube according to the invention formed by the dies shown in FIGS. 17a and 17b.
Figure 19:
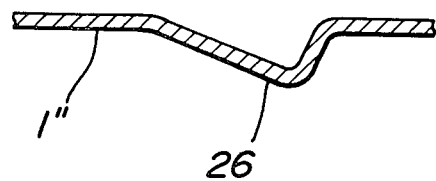
FIG. 19 is a partial sectional view of the blank tube taken along the line B—B in FIG. 18.

In such a bulging action, the blank tube 1" is simultaneously formed with hemiconical protrusions 26 at locations corresponding to the hemiconical recesses 2c formed in the dies 2 as shown in FIGS. 18 and 19. The word "hemiconical" used herein means such a shape obtained by dividing a cone into two parts substantially along its generators passing through its apex.

Figure 20:
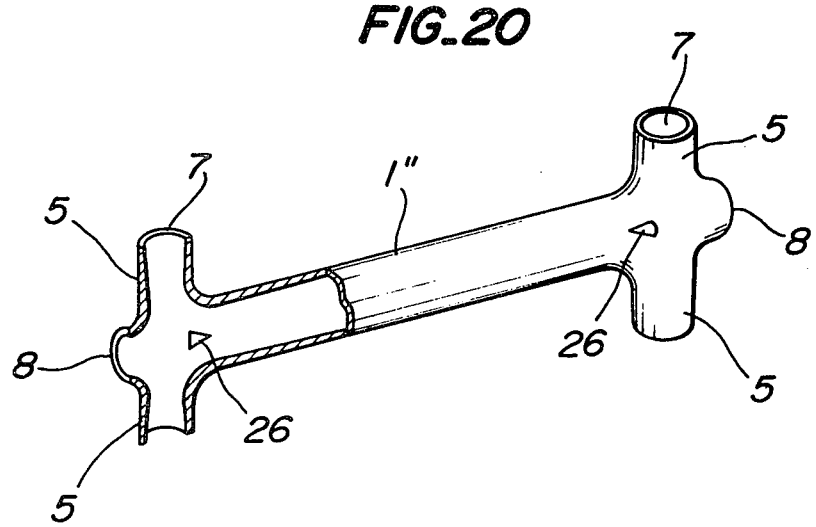
FIG. 20 is a perspective view, partially removed, of the blank tube, distal ends of expanded portions being cut off to form through-holes.
Figure 25:
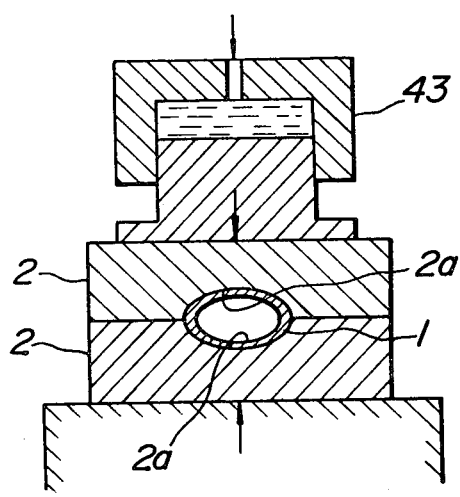
FIG. 25 is a sectional view of separable dies pressing a blank tube arranged therein.

Distal ends of the tubular expanded portions 5 of the thus formed blank tube 1" are cut off to form through-holes 7 as shown in FIG. 20. The hemiconical protrusions 26 are formed in their bottom surfaces with apertures 28 for introducing therethrough wires, electric lead wires and the like. The compressed ends 8 of the blank tube 1" are cut off by punching or cutting to form openings 30 as shown in FIG. 22, thereby obtaining a main frame F for a two-wheeled vehicle according to the invention. A wire-like member 31 such as a brake wire, electric wire or the like can be passed through the thus formed main frame F at the piercing apertures 28 as shown in FIG. 23.

FIG. 24 illustrates a whole bicycle using the main frame F according to the invention, including a head tube 32 and a seat tube 33 inserted into and fixed to the front and rear through-holes of the main frame F, respectively.

According to a more preferable embodiment of the invention, a straight cavity 2a between expanding cavities 2b of the dies 2 is so formed as to have a particular cross-section such as an elliptical section. When a tube 1 is arranged in the cavity of the dies 2, the separable dies 2 are clamped by means of a die clamping press 43. As the die clamping press 43 has a statical pressing capacity of the order of 200 t, the tube 1 in the cavity 2a is easily collapsed into a desired section by the clamping action of the press. A load of 5-6 t is usually enough to collapse the tube 1 in such a manner.

Figures 26A, 26B, 26C, 26D:
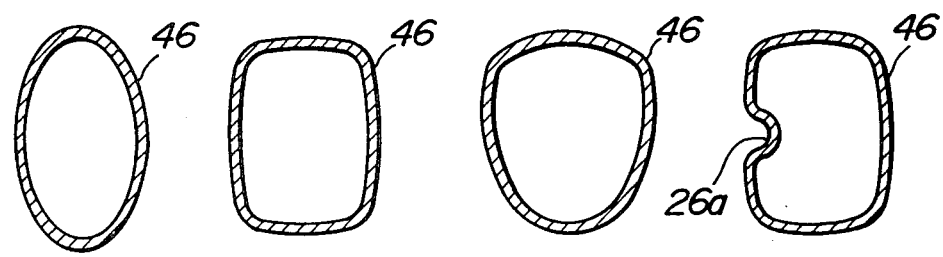
FIGS. 26a–26d illustrate various cross-sections of the main tube according to the invention.

The cross-section of the main part of the blank tube 1″ is, for example, vertically elongated elliptical as shown in FIG. 26a. However, the cross-section may be other particular shape, substantially vertically elongated rectangular as shown in FIG. 26b, substantially inverted triangular as shown in FIG. 26c or substantially rectangular including a concaved portion 26a for receiving an operating wire or electric wire.

The present invention can bring about the following significant function and effect.

(1) Joint portions are formed integrally with a frame tube, so that separate parts such as lugs are eliminated, and finishing curved surfaces of the joints are not needed. Moreover, when a long tube such as a seat tube is inserted into the through-hole of the tubular expanded portions, the assembly is obtained with a higher accuracy because the integral jointed portions can correctly determine angles between the tubes. Furthermore, as the separate parts such as lugs at the joints are eliminated, there is no any sharp change in sectional configuration at the joints usually subjected to large stresses, so that any stress concentration does not occur.

(2) As a main frame including a head tube joint and a seat tube joint is formed as a unitary construction from a blank tube by cold working, the production efficiency can be greatly improved without any decrease in strength of parts and without requiring complicated welding process.

(3) The portions as at and in the proximity of the joints which will be subjected to large stresses are previously made thicker, so that high strength frames can be obtained.

(4) Frame members such as the seat tube can be securely fixed to the joints. Different from complicated surfaces to be welded in the prior art, simple circumferential surface is easily welded without particular jigs by even an unskilled worker.

(5) As the blank tube has the gradually enlarged diameter portion adjacent to the tubular expanded portions according to the one embodiment of the invention, even if the wall thickness of that portion of the tube becomes somewhat thinner, its modulus of section increases as compensation for the thinner wall so that the increased modulus of section serves to suppress the stresses acting thereupon.

(6) The blank tube according to the invention can provide frames with high accuracy for two-wheeled vehicles, which are light, rigid and inexpensive.

(7) As the head tube which is important for rigidity is press fitted in the inner tube to provide a double construction and a lug for connecting the seat tube is eliminated, the frame is lighter than and superior to that having separate lugs.

(8) The double construction of the head tube including the inner tube provides a stepped portion owing to the thickness of the wall at the opening to form an ornamental pattern which improves the aesthetical appearance.

(9) With the double construction of the head tube, the part of the surface of the inner tube appears at the opening of the head tube, so that if the inner tube is made of, for example, stainless steel, the head tube will exhibit a design effect or a sense of beauty which has never been obtained.

(10) The substantially hemiconical protrusions are formed on the tube by simultaneously when the blank tube is formed by bulging, and thereafter all that is required is forming apertures, so that the process is easily automated and there is no risk of loss of strength of the tube due to heating in welding. Brake wires and electric wires pass through the tube without any exposure to provide an aesthetical bicycle.

(11) The main tube portion of the main frame can be formed in a desired particular cross-section to obtain a main frame without any superfluous wall thickness according to the purpose of the bicycle. For example, a vertically elongated section of the tube increases its resistance against vertical forces which are the largest of forces acting upon the main tube to increase the effective strength in comparison with a main frame having an equivalent circular cross-section. Accordingly, the strength of the main frame is increased without increasing its weight.

While the invention has been particularly shown and described with reference to preferred embodiments thereof, it will be understood by those skilled in the art that the foregoing and other changes in form and details can be made therein without departing from the spirit and scope of the invention.

What is claimed is:

1. A blank tube for a two-wheeled vehicle, comprising a main tubular portion having thicker walls towards the ends and tubular expanded portions extending in a direction substantially transverse to a major axis of said tube from at least one end of the thicker wall of said main tubular portion, said thicker walls and said tubular expanded portions being formed in dies by applying high hydraulic pressure to an inside of said tube and simultaneously applying compressive force to said tube in its axial direction.

2. A blank tube as set forth in claim 1, wherein said main tubular portion comprises a gradually enlarged diameter portion adjacent to said tubular expanded portions at said at least one end of the tube.

3. A blank tube as set forth in claim 1, wherein said main tubular portion comprises protrusions formed thereon simultaneously with the forming of said thicker walls and said tubular expanded portions with the aid of recesses formed in said dies.

4. A blank tube as set forth in claim 3, wherein said protrusions are hemiconical which is of a shape obtained by dividing a cone substantially along its generators passing through its apex and their bottom surfaces with apertures.

5. A blank tube as set forth in claim 1, wherein said main tubular portion has a particular cross-section formed by said dies simultaneously with the forming of said thicker walls and said tubular expanded portions.

6. A main frame for a two-wheeled vehicle, comprising a blank tube including a main tubular portion having thicker walls towards the ends and tubular expanded portions extending in a direction substantially transverse to a major axis of said tube from at least one end of the thicker wall of said main tubular portion, said thicker walls and said tubular expanded portions being formed in dies by applying high hydraulic pressure to an inside of said tube and simultaneously applying compressive force to said tube in its axial direction, distal ends of said tubular expanded portions being cut off to form through-holes and at least one compressed end of said main tubular portion being cut off to form an opening; and a head tube and a seat tube inserted into and fixed to said through-holes, respectively.

7. A main frame as set forth in claim 6, wherein said main frame comprises an inner tube press fitted in one of said through-holes before said head tube is inserted into the through-hole.

8. A main frame as set forth in claim 7, wherein said inner tube includes a top bearing cup and a bottom bearing cup press fitted in an upper and a lower end of said inner tube to form a top and a bottom bearing support for the head tube.

9. A main frame as set forth in claim 6, wherein said main tubular portion comprises a gradually enlarged diameter portion adjacent to said tubular expanded portions at at least one end of the tube.

10. A main frame as set forth in claim 6, wherein said main tubular portion comprises protrusions formed thereon simultaneously with the forming of said thicker walls and said tubular expanded portions with the aid of recesses formed in said dies.

11. A main frame as set forth in claim 10, wherein said protrusions are hemiconical which is of a shape obtained by dividing a cone substantially along its generators passing through its apex and their bottom surfaces with apertures.

12. A main frame as set forth in claim 6, wherein said main tubular portion has a particular cross-section formed by said dies simultaneously with the forming of said thicker walls and said tubular expanded portions.

* * * * *